FRANK V. SANDER
CLIFFORD H. COLES
INVENTORS

Patented Sept. 9, 1947

2,427,305

UNITED STATES PATENT OFFICE 2,427,305

MANUFACTURE OF DIAPHRAGMS

Frank V. Sander, Highland Park, and Clifford H. Coles, North Plainfield, N. J., assignors to Ortho Pharmaceutical Corporation, a corporation of New Jersey Application March 24, 1944, Serial No. 527,900

4 Claims. (Cl. 18—47.5)

1

This invention relates to the manufacture of diaphragms of the type particularly suitable as, and sometimes called, pessaries.

Diaphragms of this character are customarily thin walled rubber diaphragms reinforced by a spring at the base and heretofore have been made by molding or dipping. In the latter case the diaphragm was made by dipping a mold into a liquid rubber such as latex and a spring was then coated with an adhesive placed upon the mold and rolled up in the skirt of the diaphragm toward the dome.

It has been found that diaphragms made of thin flexible resilient sheets of plastic materials, have certain advantages over those made of rubber. For example, plastic diaphragms are more resistant to many therapeutic agents and solvents found in creams or jellies frequently used in conjunction with diaphragms, which agents and solvents react detrimentally upon rubber. In addition certain of the flexible resilient plastics obtainable in liquid form such as plasticized vinyl resins with solvents or other synthetic organic polymers (for example only), when in sheet form have sufficient resiliency and elasticity for diaphragm use and are tougher and more durable when so used than rubber.

The production of diaphragms from such plastics in liquid form involves certain manufacturing problems because most if not all plastics suitable for diaphragm use adhere strongly to other objects such as molds but do not cohere or stick to themselves. This characteristic introduces great difficulties in manufacture because diaphragms of this nature are usually provided at the rim or edge with a coiled continuous circular metallic spring, preferably if not necessarily embedded or entirely encased by the material of the diaphragm. This embedding is usually accomplished by rolling the spring in the wall or skirt of the diaphragm. In the manufacture of rubber diaphragms by the dipping process it is customary to dip a mold in latex and form a dome and a skirt portion which is later rolled up about this spring. As previously stated, most if not all plastics otherwise satisfactory for making diaphragms are not cohesive but are strongly adhesive. In other words, a thin film of the plastic formed by dipping a mold into a liquid plastic will adhere very strongly to the mold but will not cohere to itself, and, therefore, does not readily permit rolling of a spring upon itself to encase it as is customary in the manufacture of such diaphragms from rubber latex solutions or dispersions.

2

It is a purpose of this invention to provide a method whereby plastic diaphragms may be made upon a commercial scale from plastics in liquid form by employing a dipping process.

Other objects and advantages resulting from this invention will be apparent from the following description of the invention given in connection with the accompanying drawing in which.

Figure 1:
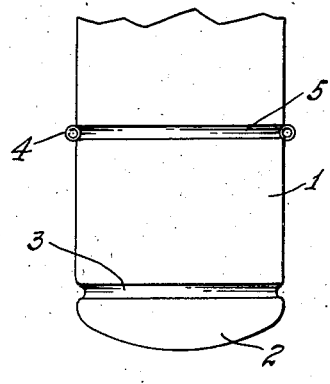
Fig. 1 is a side elevation of a mold and illustrates the first step in the method embodied in this invention.
Figure 2:
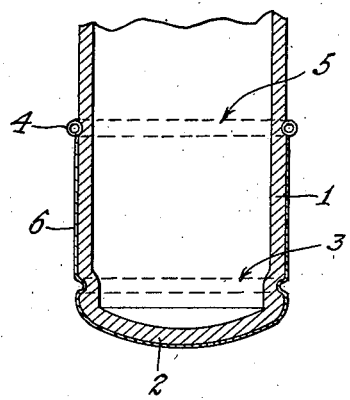
Fig. 2 is a vertical transverse section through the same mold illustrating the second step carrying out the method of this invention.
Figure 3:
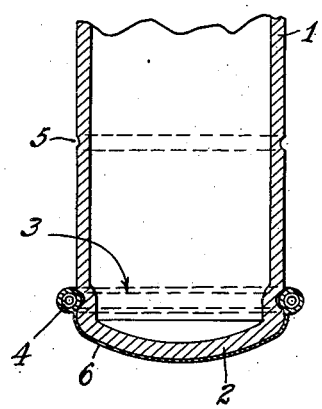
Fig. 3 is a view similar to Fig. 2 and illustrates the next step in practicing this invention.
Figure 4:
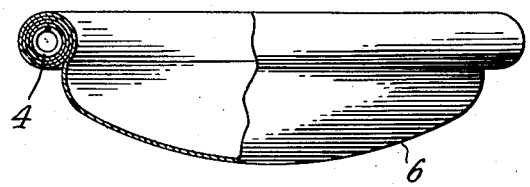
Fig. 4 is a side elevation of the finished diaphragm stripped from the mold and resulting from the method of this invention.

In following the process of this invention a mold 1 is employed, the closed end 2 of which has the desired shape of the finished diaphragm. Adjacent this latter end the mold is provided with an annular groove 3 for receiving a coiled spring 4 after it is rolled as will be hereafter described. At a distance above groove 3, preferably three or four complete turns of the spring above, the mold is provided with a second but relatively shallow groove 5 of sufficient depth only to retain the spring in position and prevent its movement along the mold by its own weight. Any other satisfactory device, such as protrusions or rings may be employed to retain the spring in position.

As previously stated diaphragms of the character of this invention are provided around their lip or margin with a coiled metallic spring 4 arranged in a continuous circle. In practicing this invention such a spring 4 is first placed upon the mold 1 in position in the groove 5. No adhesive is applied to the spring. The mold is then slowly dipped in a liquid form of the desired plastic, said liquid being at the desired consistency and temperature, until the plastic touches the spring. The mold is then slowly withdrawn and preferably inverted until the coating or film 6 formed by the dipping is dried or solidified. It is preferred to dip the mold to a depth just sufficient to contact the coiled spring. This causes the first layer or coating to be anchored to the spring. In some instances where the plastic is particularly adherent to the mold after drying it may be preferred to dip the mold somewhat deeper so as to cause the plastic to enter the convolutions of the coiled spring thus causing the first coating or layer to be more firmly anchored to the spring. This first dipping serves the dual purpose of attaching the spring so that it may be rolled with the apron and also provides one coating of the diaphragm wall, all in one operation. After drying, the mold is again dipped a sufficient number of times to produce the desired wall thickness of plastic upon the mold. Preferably after each dipping the mold is again inverted, spun if desired, and then dried in a warm oven in a moderate air circulation. After the wall thickness has just about reached the desired thickness and after drying, the coiled spring is rolled along the mold in the skirt portion toward the dome end whereby the skirt portion of the thus formed diaphragm is picked up and rolled about the spring completely enclosing the latter. This rolling is possible because although the plastic adheres tightly to the mold the end of the coating of plastic is firmly attached and anchored to the spring by the former step of dipping. This rolling is complete when the spring reaches the groove 3. As heretofore stated the distance between grooves 3 and 5 is such that the coiled spring will make the desired number of complete revolutions. Otherwise there would be a tendency for the spring to continue rotating after the finished diaphragm was removed, and there must be no strain upon the spring, i. e., tendency toward further rolling, when it is in the groove 3 in order that the wall of the diaphragm will depend from the spring at the proper point after the diaphragm is removed from the mold.

After the skirt has been rolled and the covered spring or bead is resting in groove 3 the mold is again dipped into the plastic to a point where the final coating engages the rolled bead to seal the spring in its rolled position and thus prevent unrolling thereafter. This last dipping also serves a dual purpose, i. e., it seals the rolled spring and adds to the wall thickness of the diaphragm in a single operation. After again drying the diaphragm is removed from the mold. It may then be treated in warm water, oiled if it is to be transparent, or powdered and packed for storage.

In those instances where the plastic is of such character that it does not adhere quite so tightly to the mold, it may be advisable to form one or two coatings upon the mold before the spring is placed on the mold. In some instances it has been found that one dipping, in which the spring is contacted will provide a sufficient anchorage for the spring to the plastic to permit rolling of the skirt portion of the diaphragm, after which a final dipping can be made to seal the rolled skirt in rolled position.

In some instances it has been found that only one dipping of the mold with the spring thereon is necessary to accomplish both anchorage of the spring to the skirt and sealing of the rolled skirt. That is, it is possible to utilize the final dipping of the diaphragm for both anchorage and sealing. In such instances the spring may be placed on the mold just prior to the final coat. The mold then may be given the final dip by immersing the mold, with the spring in position in the plastic, until the spring is contacted and then slowly removed. After partial drying and while the final coat is still tacky the skirt may be rolled with the spring therein, the spring coming to rest in groove 3 before the final coat has completely dried. Upon drying the spring and skirt is sealed without the necessity of separately cementing the spring to the skirt before and after rolling.

It will be apparent to those skilled in the art from the foregoing that by following the teachings of the above invention the usual steps of cementing a spring to the skirt portion of the diaphragm has been eliminated and that other advantages will result from following this invention. It will also be apparent that minor variations may be made in the methods described without departing from the spirit and scope of this invention as defined in the appended claims.

We claim:

1. The method of making diaphragms which consists in the steps of positioning a circular spring at a predetermined position upon a mold, retaining the spring in said position on the mold, dipping the mold while retaining the spring in said position into a liquid plastic of a synthetic organic polymer to a depth until the spring is contacted by the plastic, removing the mold from the plastic to form a coating of the plastic on the mold, permitting the mold and coating to solidify sufficiently to anchor the spring to the coating, rolling the spring on the skirt portion of said coating with the spring therein toward the dome a predetermined number of complete turns, thereafer permitting said coating to completely solidify thus sealing the spring and skirt in rolled position, and removing the completed diaphragm from said mold.

2. The method of making diaphragms which consists in the steps of positioning a circular spring at a predetermined position upon a mold, retaining such spring in said position on the mold, dipping the mold while retaining the spring in said position into a liquid plastic of a synthetic organic polymer solution to a depth until the spring is contacted by the plastic, removing the mold and spring from said plastic, drying the coated mold to form a solid coating of the plastic on the mold with the spring anchored to the coating, rolling the spring on the skirt portion of the coating with the spring therein toward the dome a predetermined number of complete turns, redipping said mold into the plastic solution until the rolled skirt portion is contacted by the plastic and then withdrawing the mold, drying the final coating, thus simultaneously sealing the latter in its rolled position and increasing the thickness of the coating, and thereafter removing the formed diaphragm from said mold.

3. The method of making diaphragms from plastics which consists in the steps of dipping a dome shapped mold with a circular spring thereon while the latter is retained in position on said mold, into a liquid plastic of a synthetic organic polymer until such spring is contacted by the plastic, removing said mold and spring from the plastic, permitting the film on said mold to at least partially solidify, thus forming a coating of plastic on the mold with the coating anchored to the spring, rolling the skirt portion of said coating and the spring with the spring therein upon the mold toward the dome of said mold to a predetermined position on said mold, thereafter redipping said mold into the plastic until the rolled skirt portion is contacted and withdrawing the mold, permitting the coat on said mold to solidify, thus sealing the rolled portion of the coat in its rolled position, and thereafter removing the completed diaphragm from said mold.

4. The method of making diaphragms from plastics which consists in the steps of simultaneously depositing a coating of a plastic of a synthetic organic polymer and anchoring said coating to a spring by dipping a mold with a circular spring positioned thereon into a liquid plastic until the spring is contacted by the plastic, removing said mold and spring from the plastic, permitting the coating on mold to solidify, rolling the skirt portion of said coating with the spring therein on the mold toward the end thereof to a predetermined position on said mold, thereafter simultaneously sealing the rolled portion and increasing the wall thickness of the diaphragm by redipping said mold into the plastic until the rolled skirt portion is contacted by the plastic, removing the mold from the liquid plastic and permitting the coating thereon to solidify, and thereafter removing the completed diaphragm from said mold.

FRANK V. SANDER.
CLIFFORD H. COLES.

REFERENCES CITED

The following references are of record in the file of this patent:

UNITED STATES PATENTS

| Number | Name | Date |
|---|---|---|
| 2,024,539 | Schmid | Dec. 17, 1935 |
| 2,111,313 | Clark | Mar. 15, 1938 |
| 2,017,604 | Mountford et al. | Oct. 15, 1935 |
| 2,283,238 | Thompson | May 19, 1942 |
| 2,314,262 | Winder | Mar. 16, 1943 |
| 2,371,883 | Gammeter et al. | Mar. 20, 1945 |